| United States Patent [19] | [11] | 4,222,782 |
|---|---|---|
| Alliegro et al. | [45] | Sep. 16, 1980 |

[54] REFRACTORY RAMMING MIX CONTAINING ALUMINUM POWDER FOR METAL MELTING FURNACES

[75] Inventors: Richard A. Alliegro, Holden; Ronald A. Stark, Hubbardston, both of Mass.

[73] Assignee: Norton Company, Worcester, Mass.

[21] Appl. No.: 72,008

[22] Filed: Sep. 4, 1979

Related U.S. Application Data

[63] Continuation-in-part of Ser. No. 932,772, Aug. 11, 1978, abandoned, which is a continuation-in-part of Ser. No. 842,127, Oct. 14, 1977, abandoned.

[51] Int. Cl.³ .............................................. C04B 35/04
[52] U.S. Cl. .......................................... 106/57; 106/58; 106/59; 106/62; 106/65; 106/66; 106/69

[58] Field of Search .................. 106/44, 57, 58, 59, 106/62, 65, 66, 67, 69

[56] References Cited

U.S. PATENT DOCUMENTS

| 3,775,139 | 11/1973 | Gamble et al. | 106/67 |
| 4,028,122 | 6/1977 | Greenewald | 106/44 |
| 4,069,060 | 1/1978 | Hayashi et al. | 106/44 |

*Primary Examiner*—James Poer
*Attorney, Agent, or Firm*—Rufus M. Franklin

[57] ABSTRACT

A refractory ramming mix for forming linings for containers of molten metal contains graded refractory grains size to minimize porosity, optional sintering aids or fluxes, and aluminum powder in the amount of 1 to 15% by volume.

3 Claims, No Drawings

REFRACTORY RAMMING MIX CONTAINING ALUMINUM POWDER FOR METAL MELTING FURNACES

RELATION TO PRIOR APPLICATIONS

This application is a continuation-in-part of U.S. application Ser. No. 932,772, filed Aug. 11, 1978, which is a continuation-in-part of U.S. application Ser. No. 842,127, filed Oct. 14, 1977, both now abandoned.

BACKGROUND OF THE INVENTION

Dry vibrated or rammed-in-place refractory cements for linings for molten metal furnaces or containers have been known in the literature since at least as early as British Pat. No. 226,801 to Rohn. Such mixes are typically rammed in place between the coil of a coreless induction furnace and a form such as a steel shell (where steel or iron is being melted). The steel shell and added charge is inductively heated and melted to "fire" the refractory lining. Such linings fail by penetration of the melt through the lining by cracking, erosion and too much porosity.

Typically, in ferrous metal melting, such linings may last for less than one week of production.

The use of aluminum metal in refractory mixes, for forming bricks is known. However, no use of fine aluminum in dry vibratory ramming mixes, to oxidize to form alumina, is known, prior to the present invention.

BRIEF SUMMARY OF THE INVENTION

The present invention resides in the addition of fine aluminum powder to dry vibratory or ramming mix consisting of a graded refractory grain mixture with or without one or more sintering or bonding aids. The aluminum should be present in the calculated amount of from 1 to 15% by volume of the total solids. For alumina mixtures from 1 to 10% by weight is satisfactory. For denser zirconia mixes, less aluminum powder will be required to provide the same volume % in the mix. Oxides of boron, particularly boric acid, are useful additions and are believed to provide a source of oxygen to promote the combustion of the aluminum powder. Other sources of oxygen are the water from boric acid, ambient atmosphere, and metal oxides, e.g. iron oxide in the contained molten metal.

The aluminum should be in the form of an impalpable powder, 10 microns or less in particle diameter, preferably 5 microns or less.

Preferred refractory grains are alumina, magnesia, magnesia-chromia, and spinel. Mixtures of these materials may be used. When fused spinel ($MgO.Al_2O_3$) grain is employed, it is desirable to include reactive fines of alumina and magnesia in the mix, which form spinel in situ upon firing, as is well known in the art, to help form a dense lining. The aluminum, in use conditions in the furnace (or upon preliminary heating), oxidizes to form gamma type alumina, and increases in volume. This results in decreased porosity, and it is believed the heat of combustion of the metal also aids in the sintering. In any event improved linings, in terms of increased life and decreased porosity are the result, when linings formed from mixes of this invention are compared to similiar mixes which do not contain aluminum powder.

The maximum amount of aluminum powder which is useful in the invention is determined by the pore volume of the cement expansion of the aluminum when it oxidizes, and reaction with ambient gases. The maximum weight percent allowable is about 3% and 0.3% by volume is the lower limit.

The most useful refractory grains for metal melting furnace linings of this invention are alumina, magnesia, magnesia-chromia, magnesia-alumina spinel, and alumina-chromia. Of less general utility are linings of silica grains, silicon carbide grains, mullite grains, zircon grains, and zirconia grains.

SPECIFIC EMBODIMENTS OF THE INVENTION

In the following examples "mesh size" refers to the U.S. Standard mesh sieve screens. A preferred example of the invention is composed as follows (all parts by weight):

| | | |
|---|---|---|
| fused alumina, through 4 on 16 mesh; | | 38 parts |
| fused alumina sized as follows: | | |
| on 16 mesh, | trace to 5% | |
| on 50 mesh, | 40 to 45% | |
| | | 25 parts |
| on 200 mesh, | 20 to 50% | |
| on 325 mesh, | 1 to 10% | |
| fused alumina coated with about 4 weight % glass (as disclosed in U.S. Pat. No. 3,793,040), the coated particles being through 24 on 90 mesh: | | 20 parts |
| raw kyanite through 170 on 200 mesh: | | 20 parts |
| alumina powder through 200 mesh: | | 5 parts |
| silicon carbide powder through 200 mesh: | | 5 parts |
| aluminum metal powder, 4.5 micrometer diameter: | | 0.6 parts |
| boric acid: | | 1 part |

To characterize and test some of its properties, a mix of the above compositions was formed into a lining in a steel melting furnace, and pieces of the lining were examined. The heat formed cement had an apparent porosity (volume of open pores) of 17%, and a bulk density of 200 pounds per cubic foot (3.2 gms/cc). Without the aluminum additions, the cement after forming in a steel melting furnace had an apparent porosity of 20%, and a density of 185 pounds per cubic foot (3.0 gms/cc).

The cement containing aluminum powder was used in a test in a coreless furnace melting recycled steel. Previously no cement, including those based on silica, zircon, magnesia, and alumina, had lasted a week in this environment. All failed by severe erosion, metal penetration. Erosion and chemical attack were low.

An example of how to make and use a formulation which does not employ any low temperature flux is presented below.

| Formulation: | | | |
|---|---|---|---|
| Material | | Size | Wt. % |
| $Al_2O_3$ aggregate | 94.5% pure | 6F | 60 |
| $Al_2O_3$ aggregate | 99.5% pure | 24F | 30 |
| $Al_2O_3$ finely crushed | 99.8% pure | 200F | 4 |
| $SiO_2$ aggregate | 99.0% pure | 100F | 3 |
| Aluminum Powder | | 4micron | 3 |
| Use: | | | |
| Installation- | Vibrated into place using forms. | | |
| Firing Schedule- | 1. Bring temperature to 400° F. at 100° F./hour. | | |
| | 2. Hold at 400° F. for one hour. | | |
| | 3. Bring to 1000° F. at 300° F./hour. | | |
| | 4. Hold at 1000° F. for one hour. | | |

What is claimed is:

1. A dry refractory ramming or vibration cement for forming monolithic linings in situ in metal furnaces consisting of coarse, intermediate, and fine particles of a crystalline refractory selected from the group consisting of alumina, alumina-chromia, zirconia, spinel, silica, silicon carbide, magnesia-chromia, zircon, mullite, magnesia, and combinations thereof, up to 5% of an intermediate temperature flux, and finely particulate aluminum having a particle size of 10 microns or less sufficiently finely divided to oxidize to alumina in situ during the operation of the furnace, said aluminum being present in an amount insufficient to produce a direct electrical path through the rammed refractory mix, and insufficient to completely fill the pores of the rammed mix upon oxidation to alumina, but being present in an amount at least equal to 0.3% and not more than 3%, by weight, of the mixture solids.

2. A cement as in claim 1 containing at least one fluxing aid selected from the group consisting of glass, clay, and boric acid in the amount of up to 5% by weight.

3. A cement as in claim 1 in which the crystalline refractory is selected from the group consisting of alumina, magnesia, and spinel.